(12) United States Patent
Qin et al.

(10) Patent No.: US 8,700,859 B2
(45) Date of Patent: Apr. 15, 2014

(54) TRANSFER REQUEST BLOCK CACHE SYSTEM AND METHOD

(75) Inventors: Shuang-Shuang Qin, Beijing (CN); Jiin Lai, Taipei (TW); Zhi-Qiang Hui, Beijing (CN); Xiu-Li Guo, Beijing (CN)

(73) Assignee: VIA Technologies, Inc., Taipei (TW)

( * ) Notice: Subject to any disclaimer, the term of this patent is extended or adjusted under 35 U.S.C. 154(b) by 153 days.

(21) Appl. No.: 12/829,343

(22) Filed: Jul. 1, 2010

(65) Prior Publication Data
US 2011/0066812 A1 Mar. 17, 2011

Related U.S. Application Data

(60) Provisional application No. 61/242,401, filed on Sep. 15, 2009.

(51) Int. Cl.
*G06F 12/00* (2006.01)
(52) U.S. Cl.
USPC ............................ 711/137; 711/118; 711/126
(58) Field of Classification Search
None
See application file for complete search history.

(56) References Cited

U.S. PATENT DOCUMENTS

| | | | | | |
|---|---|---|---|---|---|
| 4,157,587 | A | * | 6/1979 | Joyce et al. .................... | 711/137 |
| 5,509,135 | A | * | 4/1996 | Steely, Jr. ..................... | 711/147 |
| 2004/0186946 | A1 | * | 9/2004 | Lee ............................... | 711/103 |
| 2005/0132117 | A1 | * | 6/2005 | Hsieh ............................ | 710/313 |
| 2006/0026365 | A1 | * | 2/2006 | Yamazaki ..................... | 711/137 |
| 2008/0276037 | A1 | * | 11/2008 | Chang et al. ................. | 711/103 |
| 2009/0172214 | A1 | | 7/2009 | McGowan | |
| 2010/0049953 | A1 | * | 2/2010 | Mylavarapu et al. ......... | 712/225 |

FOREIGN PATENT DOCUMENTS

| | | |
|---|---|---|
| CN | 1658592 A | 8/2005 |
| CN | 101339490 A | 1/2009 |
| TW | 511034 B | 11/2002 |
| TW | I220944 B | 9/2004 |
| WO | WO0028418 A1 | 5/2000 |

OTHER PUBLICATIONS

Intel, Intel Corel Duo Mobile Processor for Intel Centrino Duo Mobile Processor Technology, Sep. 2007, 2 pgs., http://download.intel.com/design/mobile/datashts/31407804.pdf.
Detlef Fliegl, Programming Guide for Linux USB Device Drivers, Dec. 25, 2000, pp. 17-23, http://www.lrr.in.tum.de/Par/arch/usb/download/usbdoc/usbdoc-1.32.pdf.
Taiwan Office Action, Application No. 098139107, mailed May 1, 2013.

* cited by examiner

*Primary Examiner* — Reginald Bragdon
*Assistant Examiner* — Thanh D Vo
(74) *Attorney, Agent, or Firm* — Stout, Uxa, Buyan & Mullins, LLP; Donald E. Stout

(57) ABSTRACT

The present invention is directed to a transfer request block (TRB) cache system and method. A cache is used to store plural TRBs, and a mapping table is utilized to store corresponding TRB addresses in a system memory. A cache controller pre-fetches the TRBs and stores them in the cache according to the content of the mapping table.

18 Claims, 5 Drawing Sheets

TRANSFER REQUEST BLOCK CACHE SYSTEM AND METHOD

CROSS-REFERENCE TO RELATED APPLICATIONS

This application claims the benefit of U.S. Provisional Application No. 61/242,401, filed Sep. 15, 2009, the entire contents of which are hereby incorporated by reference.

BACKGROUND OF THE INVENTION

1. Field of the Invention

The present invention generally relates to universal serial bus (USB), and more particularly to a transfer request block (TRB) cache system.

2. Description of Related Art

Universal Serial Bus (USB) is widely used in electronic devices for transferring data between a host and a peripheral device. The data transfer speed of USB 1.0 is 1.5 million bits per second (low speed) and 12 million bits per second (full speed). The data transfer speed of USB 2.0 is 480 million bits per second (high speed). USB 3.0 is released now and its data transfer speed is 4.8 billion bits per second (super speed). The detail description of USB 3.0 may be referred to "Universal Serial Bus 3.0 Specification."

In a USB system, the data transfer between the host and the device is controlled by a host controller, and the communication between the host controller and the host is specified in a host controller interface (HCI), for example, "eXtensible Host Controller Interface for Universal Serial Bus (xHCI)."

In the USB system specified by xHCI, the data structure of the transfer request block (TRB) is utilized in the data transfer. FIG. 1 shows conventional TRBs that are transferred in sequence. Specifically, each TRB includes 4 double words (DW) or 16 bytes. The host reads 4 TRBs from the system memory when reading data. For example, the host will firstly read 4 TRBs (TRB1-TRB4) starting from TRB1, where TRB1 and TRB2 are configured to be the transferred data, and TRB3 and TRB4 are used for judgment. The host will read 4 TRBs (TRB3-TRB6) starting from TRB3 after TRB1 and TRB2 are processed. Accordingly, the last 2 TRBs (for example, TRB3-TRB4) read at a previous time and the first 2 TRBs (for example, TRB3-TRB4) read at a following time are doubly read.

Additionally, after the host reads the TRBs from the system memory, the host must wait if the device is not ready or cannot transfer data because of other factors. Once the device is ready, the host will read the TRBs from the system memory again so as to cause the TRBs to read again.

For the reason that the repeated reading occurs to cause time delay, time waste and power consumption when the conventional USB system reads the data, a need has arisen to propose a novel scheme for decreasing or avoiding the repeated reading and thus advancing the production efficiency and decreasing power consumption.

SUMMARY OF THE INVENTION

In view of the foregoing, the conventional USB system can not advance the data transfer efficiency and it is an object of the embodiment of the present invention to provide a transfer request block (TRB) cache system for decreasing the repeated reading and the power consumption.

According to one embodiment of the present invention, the TRB cache system includes a cache, a mapping table and a cache controller. Specifically, the cache is used to store a number of TRBs and the mapping table is utilized to store corresponding TRB addresses in a system memory. A cache controller pre-fetches the TRBs and stores them in the cache according to the content of the mapping table. For example, the TRB is directed to read from the cache if the TRB is stored in the cache; and the TRB is read from the system memory and load it to the cache if the TRB is not stored in the cache.

DETAILED DESCRIPTION OF THE INVENTION

Although the following embodiment adopts USB 3.0, the present invention is also suitable for other USB standard. Moreover, the host controller interface (HCI) used in the embodiment is eXtensible Host Controller Interface for Universal Serial Bus (xHCI), but it is not limited herein. In the xHCI, a transfer request block (TRB) is used as a data transfer unit. However, the TRB mentioned in the present invention may be a TRB specified by other HCI standard or a similar data structure.

Figure 1:
FIG. 1 shows conventional transfer request blocks (TRBs) that are transferred in sequence.
Figure 2:
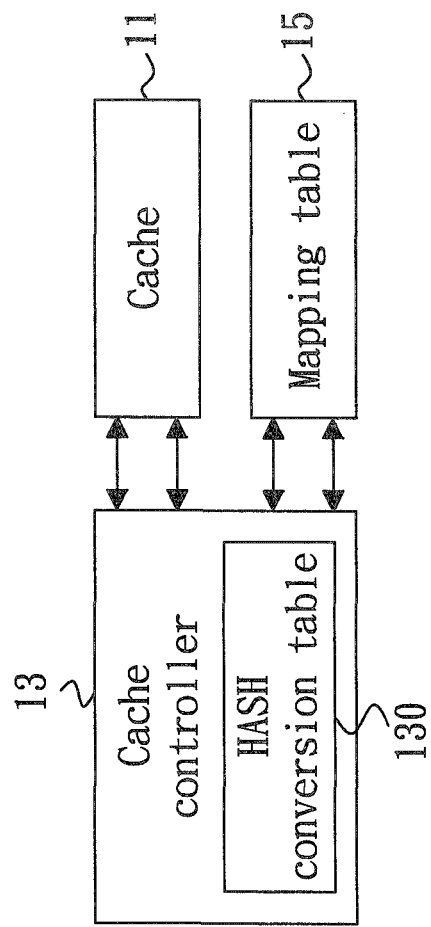
FIG. 2 shows a TRB cache system according to one embodiment of the present invention.

FIG. 2 shows a cache system of transferring transfer request block (TRB) according to one embodiment of the present invention and the cache system may be disposed inside a host controller or in other locations. The TRB cache system includes a (TRB) cache 11, a (TRB) cache controller 13 and a (TRB) mapping table 15. In the embodiment, the size of the cache 11 is 1K bit. In other words, the cache 11 is allowed to store 64 TRBs and the size of each TRB is 16 bytes (as shown in FIG. 1). Data are stored in the cache 11 line by line. There are 16 lines in the cache 11 and each line may store 4 TRBs. Accordingly, the total number of the TRBs in the cache is 64.

Figures 3, 4:
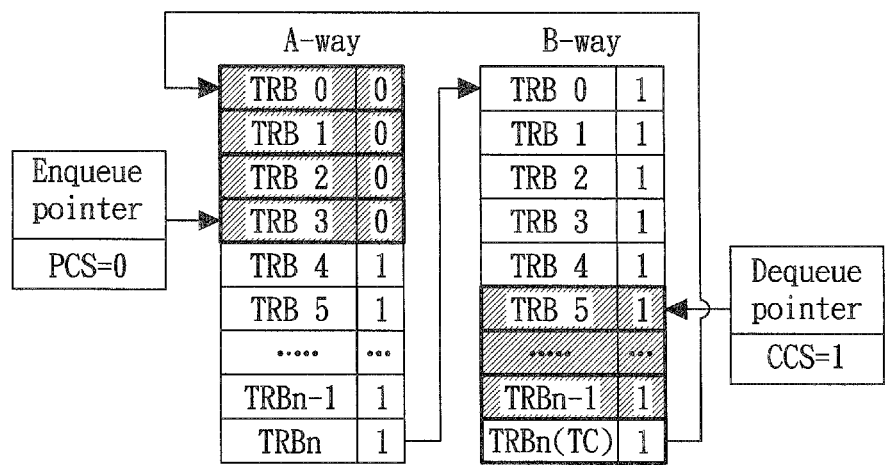
FIG. 3 shows a structure of a mapping table according to one embodiment of the present invention.
FIG. 4 shows a TRB ring formed by two TRB ways.

The mapping table 15 is used for storing corresponding TRB addresses in the system memory. According to one embodiment of the present invention, FIG. 3 shows a structure of the mapping table 15 that can be used to store 16 entries of addresses, which respectively correspond to the 16 lines mentioned above. In addition, each address is associated with 4 valid bits (for example, $V_{B3}$-$V_{B0}$ or $V_{A3}$-$V_{A0}$), which respectively represent validity of the 4 TRBs in the line. As bit 6 and above of the 4 TRBs in the same line are the same, only REQADDR[35:6] of the corresponding TRB addresses in the system memory is stored as shown in FIG. 3. In the embodiment, 2-way set association configuration is adopted in the mapping table 15, which is divided into two ways: A-way and B-way. Additionally, each way includes 8 sets. FIG. 4 shows that a TRB ring is formed by A-way and B-way for transferring data to a USB device. Specifically, an enqueue pointer points to a location at which the TRB is to be increased, and a dequeue pointer points to the TRB that is to be controlled by the host controller.

As the bits number of the address in the mapping table 15 is quite large, a large amount of time will be wasted in calculation process and location comparison. Hence, in the embodiment, a conversion table 130 is disposed in the cache controller 13. The conversion table 130 uses an index function (for example, HASH function) for converting a long address of the TRB to a short index value. As the bit [20:6] of the TRB address is equal to the bit [20:6] of the cache 11 column address, the HASH function fetches and operates the bit [20:6] of the TRB address in order to generate 3-bit output for indexing the associated address in the mapping table 15. Although the HASH function is used in the conversion table for generating the index value in the embodiment, however, conversion functions other than the HASH function may be used in other embodiments as well.

The cache controller 13 is mainly used for performing two functions: (1) pre-fetching, which is performed to load the TRB to the cache 11; (2) invalid, which is perform to make the content of the cache 11 to be consistent with the system software.

Figure 5:
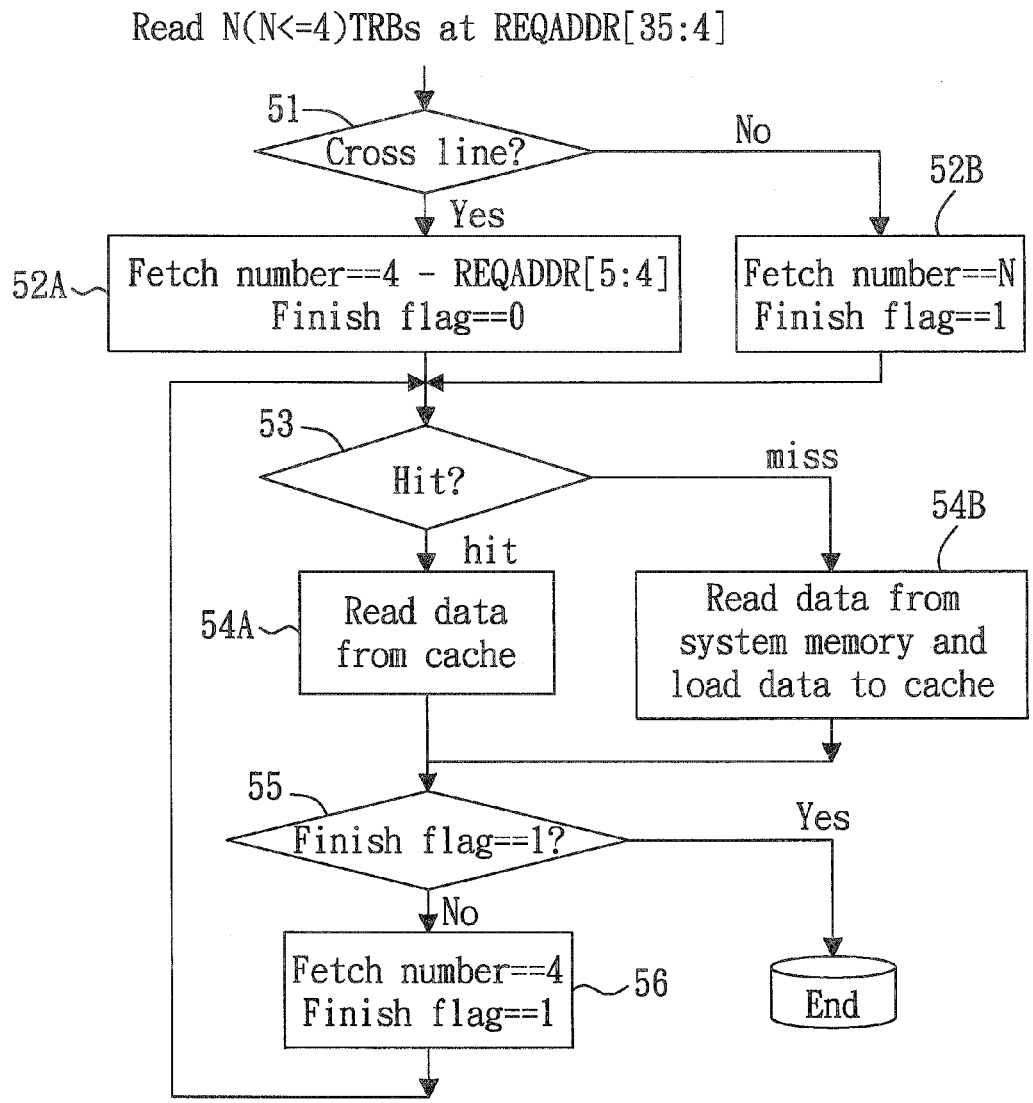
FIG. 5 shows a flow diagram that illustrated the performance of the pre-fetching by the cache controller according to the embodiment.
Figure 6:
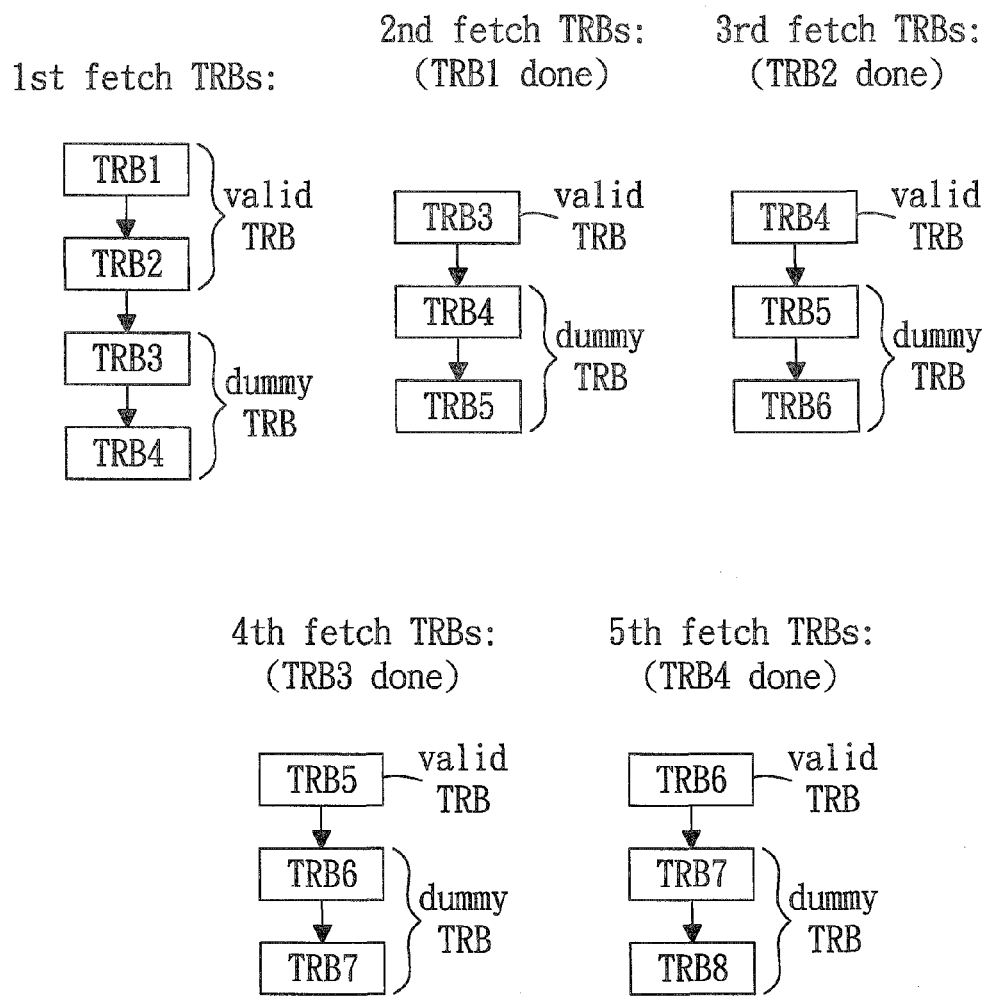
FIG. 6 shows an example of FIG. 5.

In the embodiment, by pre-fetching mechanism, the cache controller 13 stores the TRB read from the system memory into the cache 11 and transfers data. However, the cache controller 13 does not read the TRB from the system memory if the TRB has been stored in cache 11. Accordingly, the repeated reading may be avoided or decreased, thereby advancing the system performance and reducing power consumption. FIG. 5 shows a flow diagram that illustrates the performance of the pre-fetch by the cache controller 13 according to the embodiment and FIG. 6 shows an example accompanying the flow diagram.

Firstly, N TRBs (N is less than or equal to 4) are read by the host. For example, the host reads 4 TRBs (for example, TRB1-TRB4). In the embodiment, the first-read TRB (TRB1) has address at REQADDR[35:4] in the system memory. Specifically, the TRB1 and TRB2 are used to transfer data. The TRB3 and TRB4 are dummy TRB for judgment. As described above, each line in the cache 11 is used to store 4 TRBs. For example, TRB1-TRB4 are stored in the first line, and TRB5-TRB8 are stored in the second line, and so on. As TRB1-TRB4 do not cross the line (in step 51), the fetch number is 4 and the finish flag is set to "1" (in step 52B). As TRB1-TRB4 are not initially stored in the cache 11, the index values generated by the conversion table 130 with HASH function will miss the corresponding TRB in the mapping table 15 (step 53). Therefore, the flow proceeds to step 54B. The data are read from the system memory, and are loaded into the cache 11 and transferred to the host.

TRB 2 is then processed after TRB1 is done. Therefore, the host reads 3 TRBs (TRB3-TRB5) starting from TRB3. Because TRB3-TRB5 cross the line (in step 51), the 2 TRBs (i.e., TRB3-TRB4) remained in the line will be read first. In the example, the fetch number=4−REQADDR[5:4]=4−$10_2$=4−2=2 (step 52A). Specifically, REQADDR[5:4] is associated with the TRB address bits [5:4] in the system memory. At the same time, the finish flag is set to "0", indicating that the reading is not finished yet. As TRB3 and TB4 will hit the associated TRB (step 53) and the flow proceeds to step 54A, in which TRB3-TRB4 in the cache 11 are directed transferred to the host without re-reading from the system memory. Subsequently, the finish flag is determined whether to be "1" (step 55). As the finish is still "0" in the case, the flow proceeds to step 56, in which the left TRB (TRB5) is to be fetched such that the 4 TRBs starting from TRB5 are fetched from the line. Therefore, the flow proceeds to step 56 in accordance with the determined result from the step 55. Succeeding 4 TRBs (TRB5-TRB8) are read (steps 53-54B-55) and the finish flag is then set to "1."

Following the same procedure as above, TRB3 is then processed after TRB2 is done. Therefore, the host reads 3 TRBs (TRB4-TRB6) starting from TRB4. As TRB4-TRB6 have been stored in the cache 11 and they will hit the associated TRB (in step 53). As shown in FIG. 6, the TRBs are read at the third time, at the fourth time, at the fifth time, and so on.

According to one embodiment, when the value of the TRB address REQADDR[5:4] in the system memory plus the number of the pre-fetched TRBs is less than or equal to 4, it indicates that the TRBs do not cross the line. When the value of the TRB address REQADDR[5:4] in the system memory plus the number of the pre-fetched TRBs is larger than 4, it indicates that the TRBs cross the line.

According to the embodiment, the repeated reading does not occur in most of the dummy TRBs, thereby saving substantial time in reading. In addition, the TRBs may be saved beforehand in the cache 11 by the host if the USB device is not ready. Once the USB device is ready, the TRBs may be directly fetched from the cache 11 without reading from the system memory.

Figure 7:
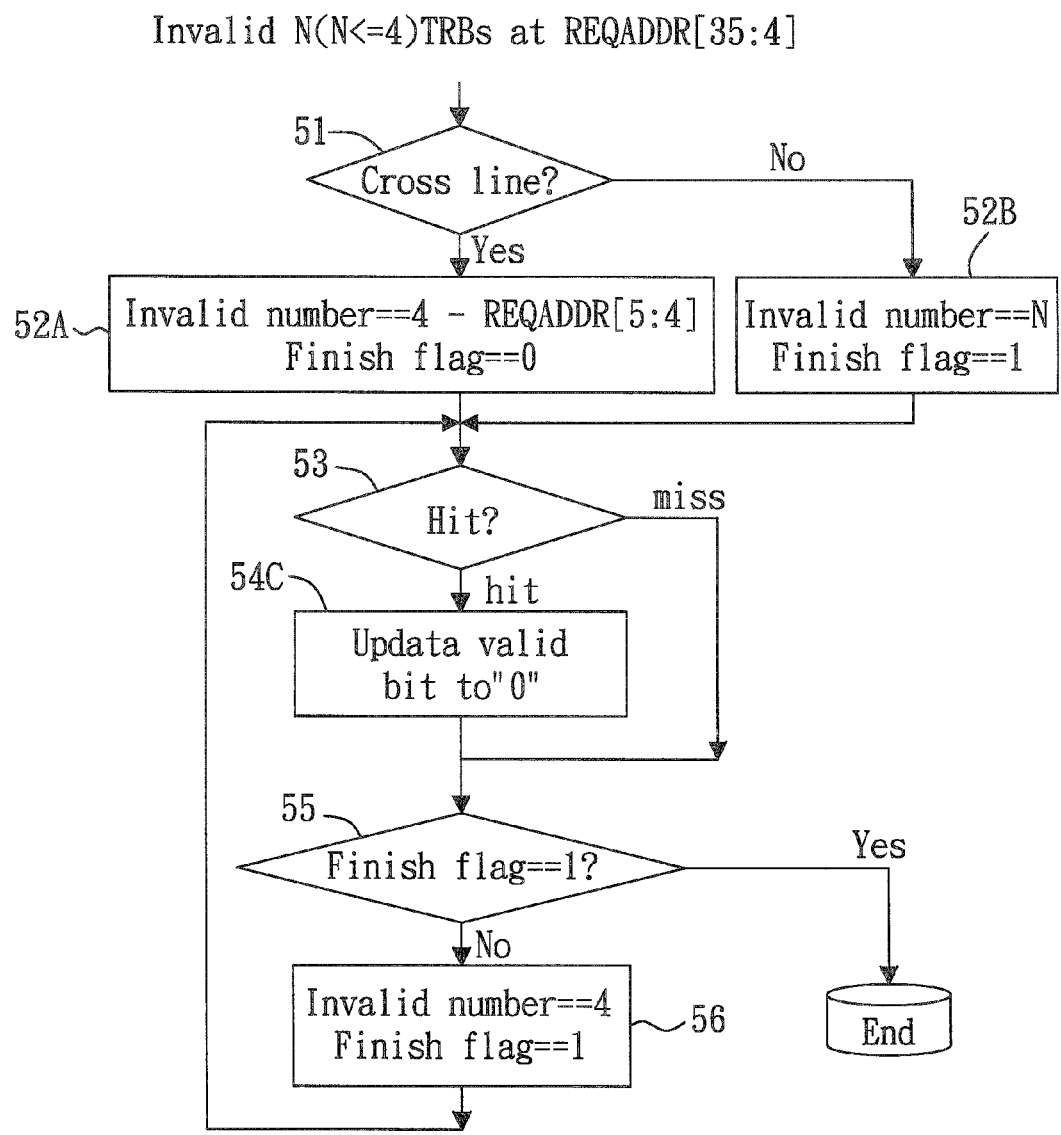
FIG. 7 shows a flow diagram that illustrates the performance of invalidation by the cache controller according to one embodiment of the present invention.

FIG. 7 shows a flow diagram that illustrates the performance of invalidation by the cache controller 13 according to one embodiment of the present invention. The flow diagram of FIG. 7 is similar to that of FIG. 5, and similar steps are denoted with same numerals. The difference between the two flow diagrams is that, in FIG. 7, the valid bit is updated to "0" to become invalid (step 54C) when hit is determined in step 53; otherwise, no act is performed when miss is determined in step 53. In the embodiment, the performance of invalidation in FIG. 7 is performed when at least one of the following cases occurs.

In the first case, the TRB is invalided after the TRB is done by the host. In the second case, the related TRB is invalided when the current TRB is determined as the Link type TRB or the TRB ring is clear to be empty by the host. In the third case, the related TRB is invalided when the current USB endpoint is stopped.

Although specific embodiments have been illustrated and described, it will be appreciated by those skilled in the art that various modifications may be made without departing from the scope of the present invention, which is intended to be limited solely by the appended claims.

What is claimed is:

1. A transfer request block (TRB) cache system in a host controller that controls data transfer between a host and a peripheral device, comprising:
    a cache configured to store a plurality of TRBs that are read from a system memory of the host, wherein the plurality of TRBs are stored in the cache line by line;
    a mapping table configured to store a plurality of TRB addresses, wherein each of the plurality of TRB addresses is composed of common address bits of system memory addresses of TRBs in the same line of the cache; and
    a cache controller configured to pre-fetch one line of TRBs at a time according to content of the mapping table and store the pre-fetched line of TRBs in the cache before the TRBs are sent to the peripheral device.

2. The system of claim 1, further comprising a plurality of valid bits associated with the plurality of TRB addresses in the mapping table, the valid bits respectively indicating validity of the TRBs in the same line.

3. The system of claim 1, wherein the mapping table uses a 2-way set association structure which has two ways, and each way includes a plurality of sets.

4. The system of claim 1, further comprising:
a conversion table configured to convert a TRB address to an index value that is used to index a corresponding TRB address stored in the mapping table.

5. The system of claim 4, wherein the conversion table uses an index function for converting the TRB address of a TRB to the index value, wherein bit number of the index value is smaller than bit number of the TRB address.

6. The system of claim 5, wherein the index function is HASH function.

7. The system of claim 1, wherein the cache controller determines whether requested TRBs are stored in the cache according to the mapping table;
wherein a current TRB of the requested TRBs is directly read from the cache if the current TRB is stored in the cache; and
wherein another line of TRBs including the current TRB is read from the system memory and loaded into the cache if the current TRB is not stored in the cache;
wherein if the requested TRBs correspond to different lines of the cache, a finish flag is asserted.

8. The system of claim 2, wherein the cache controller further determines whether a TRB is stored in the cache, and the valid bits are invalided if the TRB is stored in the cache.

9. The system of claim 8, wherein the invalidation is performed according to one of following:
when a host finishes a TRB process;
when the TRB is determined as a Link type TRB by the host or a TRB ring formed by the plurality of TRBs is empty; and
when current peripheral devices are determined by the host as disconnected.

10. A transfer request block (TRB) cache method for a host controller that controls data transfer between a host and a peripheral device, comprising:
storing a plurality of TRBs that are read from a system memory of the host in a cache, wherein the plurality of TRBs are stored in the cache line by line;
storing a plurality of TRB addresses to form a mapping table, wherein each of the plurality of TRB addresses is composed of common address bits of system memory addresses of TRBs in the same line of the cache; and
pre-fetching one line of TRBs at a time according to content of the mapping table from the system memory and storing the pre-fetched line of TRBs in the cache before the TRBs are sent to the peripheral device.

11. The method of claim 10, further comprising:
storing a plurality of valid bits associated with the plurality of TRB addresses in the mapping table, wherein the valid bits respectively indicate validity of the TRBs in the same line.

12. The method of claim 10, wherein the mapping table uses a 2-way set association structure which has two ways, and each way includes a plurality of sets.

13. The method of claim 10, further comprising:
converting a TRB address to an index value that is used to index a corresponding TRB address stored in the mapping table.

14. The method of claim 13, wherein the conversion table uses an index function for converting the TRB address of a TRB to the index value, wherein bit number of the index value is smaller than bit number of the TRB address.

15. The method of claim 14, wherein the index function is HASH function.

16. The method of claim 10, in the pre-fetching step, further comprising:
determining whether requested TRBs are stored in the cache according to the mapping table;
wherein a current TRB of the requested TRBs is directly read from the cache if the current TRB is stored in the cache; and
wherein another line of TRBs including the current TRB is read from the system memory and loaded into the cache if the current TRB is not stored in the cache;
wherein if the requested TRBs correspond to different lines of the cache, a finish flag is asserted.

17. The method of claim 11, further comprising:
determining whether a TRB is stored in the cache, and the valid bits are invalided if the TRB is stored in the cache.

18. The method of claim 17, wherein the invalidation is performed according to one of following:
when a host finishes a TRB process;
when the TRB is determined as a Link type TRB by the host or a TRB ring formed by the plurality of TRBs is empty; and
when current peripheral devices are determined by the host as disconnected.

* * * * *